United States Patent
Nunome et al.

(10) Patent No.: US 9,159,993 B2
(45) Date of Patent: Oct. 13, 2015

(54) ALKALINE BATTERY

(71) Applicants: Jun Nunome, Kyoto (JP); Fumio Kato, Osaka (JP)

(72) Inventors: Jun Nunome, Kyoto (JP); Fumio Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/116,303

(22) PCT Filed: Feb. 25, 2013

(86) PCT No.: PCT/JP2013/001053
§ 371 (c)(1),
(2) Date: Nov. 7, 2013

(87) PCT Pub. No.: WO2013/157181
PCT Pub. Date: Oct. 24, 2013

(65) Prior Publication Data
US 2014/0087240 A1    Mar. 27, 2014

(30) Foreign Application Priority Data
Apr. 16, 2012    (JP) .................. 2012-092728

(51) Int. Cl.
*H01M 4/24* (2006.01)
*H01M 4/48* (2010.01)
*H01M 4/62* (2006.01)
*H01M 10/24* (2006.01)
*H01M 4/02* (2006.01)

(52) U.S. Cl.
CPC ........ *H01M 4/24* (2013.01); *H01M 4/48* (2013.01); *H01M 4/625* (2013.01); *H01M 10/24* (2013.01); *H01M 2004/021* (2013.01); *Y02E 60/124* (2013.01)

(58) Field of Classification Search
CPC ......... H01M 4/50; H01M 4/625; H01M 6/06; H01M 10/24; H01M 4/24; H01M 4/48
USPC .......................................... 429/174
See application file for complete search history.

(56) References Cited

U.S. PATENT DOCUMENTS

| | | |
|---|---|---|
| 2006/0166095 A1* | 7/2006 | Kato et al. .............. 429/223 |
| 2008/0063938 A1* | 3/2008 | Nunome et al. ......... 429/206 |
| 2008/0193847 A1 | 8/2008 | Suetsugu et al. |
| 2009/0197169 A1* | 8/2009 | Nunome et al. ......... 429/207 |
| 2009/0202910 A1 | 8/2009 | Anglin et al. |
| 2009/0317711 A1 | 12/2009 | Kato |
| 2012/0141361 A1 | 6/2012 | Suetsugu et al. |
| 2013/0236775 A1* | 9/2013 | Nunome et al. ......... 429/185 |

FOREIGN PATENT DOCUMENTS

| | | |
|---|---|---|
| JP | 2005-158706 A | 6/2005 |
| JP | 2006-079883 A | 3/2006 |
| JP | 2007-141643 A | 6/2007 |
| JP | 2009-158257 A | 7/2009 |
| JP | 2011-068552 A | 4/2011 |
| JP | 2011-511411 A | 4/2011 |

OTHER PUBLICATIONS

International Search Report issued in International Application No. PCT/JP2013/001053 with Date of mailing Apr. 2, 2013 with the English Translation.

* cited by examiner

*Primary Examiner* — Stewart Fraser
(74) *Attorney, Agent, or Firm* — McDermott Will & Emery LLP

(57) ABSTRACT

In an alkaline battery, a positive electrode 2 containing manganese dioxide, a negative electrode 3, and a separator 4 interposed therebetween are housed in a closed-end cylindrical battery case 1 whose opening 1b is sealed with a gasket. The positive electrode contains graphite in such a manner that a ratio of graphite to the positive electrode is in the range of 2.5-4.3 mass %. A half-width of a 110 plane of the manganese dioxide measured by a powder X-ray diffraction analysis is in the range of 2.00-2.40 degrees.

4 Claims, 3 Drawing Sheets

ALKALINE BATTERY

RELATED APPLICATIONS

This application is the U.S. National Phase under 35 U.S.C. §371 of International Application No. PCT/JP2013/001053, filed on Feb. 25, 2013, which in turn claims the benefit of Japanese Application No. 2012-092728, filed on Apr. 16, 2012, the disclosures of which Applications are incorporated by reference herein.

TECHNICAL FIELD

The present disclosure relates to alkaline batteries using alkaline electrolyte.

BACKGROUND ART

Alkaline batteries are currently widely used as main power sources for toys as everyday items, game machines, mobile electronic equipment, and other devices, and are thus desired to have long lifetime when being used in such devices. To achieve a long driving time of a device, it is necessary to fill a battery with a large amount of an active material, which requires an increase in content of manganese dioxide serving as a positive electrode active material.

Patent Document 1 describes a technique for increasing the capacity by reducing the ratio of graphite in a conductive agent to be added to the positive electrode and also by using expanded graphite with priority.

Patent Document 2 describes a technique for obtaining a large-capacity battery with reduced expansion of a battery case by employing a thin body for the battery case and defining the filling density of graphite.

Patent Document 3 describes a technique for improving discharge performance under an intermediate load by controlling the half-width of a 110 plane of the crystal structure of manganese dioxide and the potential thereof. Patent Document 4 describes a technique for improving discharge performance under a high load and a low load by adjusting the ratio of the 110 plane to a 021 plane within a predetermined range.

CITATION LIST

Patent Document

PATENT DOCUMENT 1: Japanese Unexamined Patent Publication (Japanese Translation of PCT Application) No. 2011-511411
PATENT DOCUMENT 2: Japanese Unexamined Patent Publication No. 2009-158257
PATENT DOCUMENT 3: Japanese Unexamined Patent Publication No. 2011-68552
PATENT DOCUMENT 4: Japanese Unexamined Patent Publication No. 2007-141643

SUMMARY OF THE INVENTION

Technical Problem

To achieve a large capacity, it is effective to increase the amount of manganese dioxide to fill a positive electrode of a battery. The amount of manganese dioxide is generally considered to be increased by reducing the ratio of graphite serving as a conductive agent.

Alkaline batteries, however, are known to suffer from expansion of the entire positive electrodes caused by expanded crystals of manganese dioxide occurring in discharge. This expansion becomes serious with a large depth of discharge of manganese dioxide. In particular, at the end of discharge under a low load, excessive expansion of the positive electrode causes the separator and the negative electrode to be compressed, which reduces mobility of an electrolyte and ions in the battery. The reduced mobility can increase the resistance in battery reaction.

Thus, even when the ratio of graphite serving as the conductive agent of the positive electrode is reduced to increase the amount of manganese dioxide in order to increase the discharge capacity in discharge under a low load, the use of conventional manganese dioxide increases the resistance in battery reaction at the end of discharge. This increase in resistance causes a limitation of increase in discharge capacity.

In other words, an excessively low ratio of graphite to the positive electrode disadvantageously reduces discharge availability of manganese dioxide, and a failure occurs in increasing the discharge capacity under some ratios of graphite.

It is therefore an object of the present disclosure to provide an alkaline battery showing reduced expansion of a positive electrode at the end of discharge with a large discharge capacity when the ratio of graphite to the positive electrode is reduced in order to increase the discharge capacity of the alkaline battery.

Solution to the Problem

To achieve the object, in an aspect of the present disclosure, in an alkaline battery in which a positive electrode containing manganese dioxide, a negative electrode, and a separator interposed therebetween are housed in a closed-end cylindrical battery case whose opening is sealed with a gasket, the positive electrode contains graphite in such a manner that a ratio of graphite to the positive electrode is in the range of 2.5-4.3 mass %, and a half-width of a 110 plane of the manganese dioxide measured by a powder X-ray diffraction analysis is in the range of 2.00-2.40 degrees.

Advantages of the Invention

The present disclosure provides a large-capacity alkaline battery that can reduce degradation of discharge performance caused by expansion of a positive electrode when the amount of manganese dioxide is increased with a reduced ratio of graphite to the positive electrode.

DESCRIPTION OF EMBODIMENTS

Figure 1:
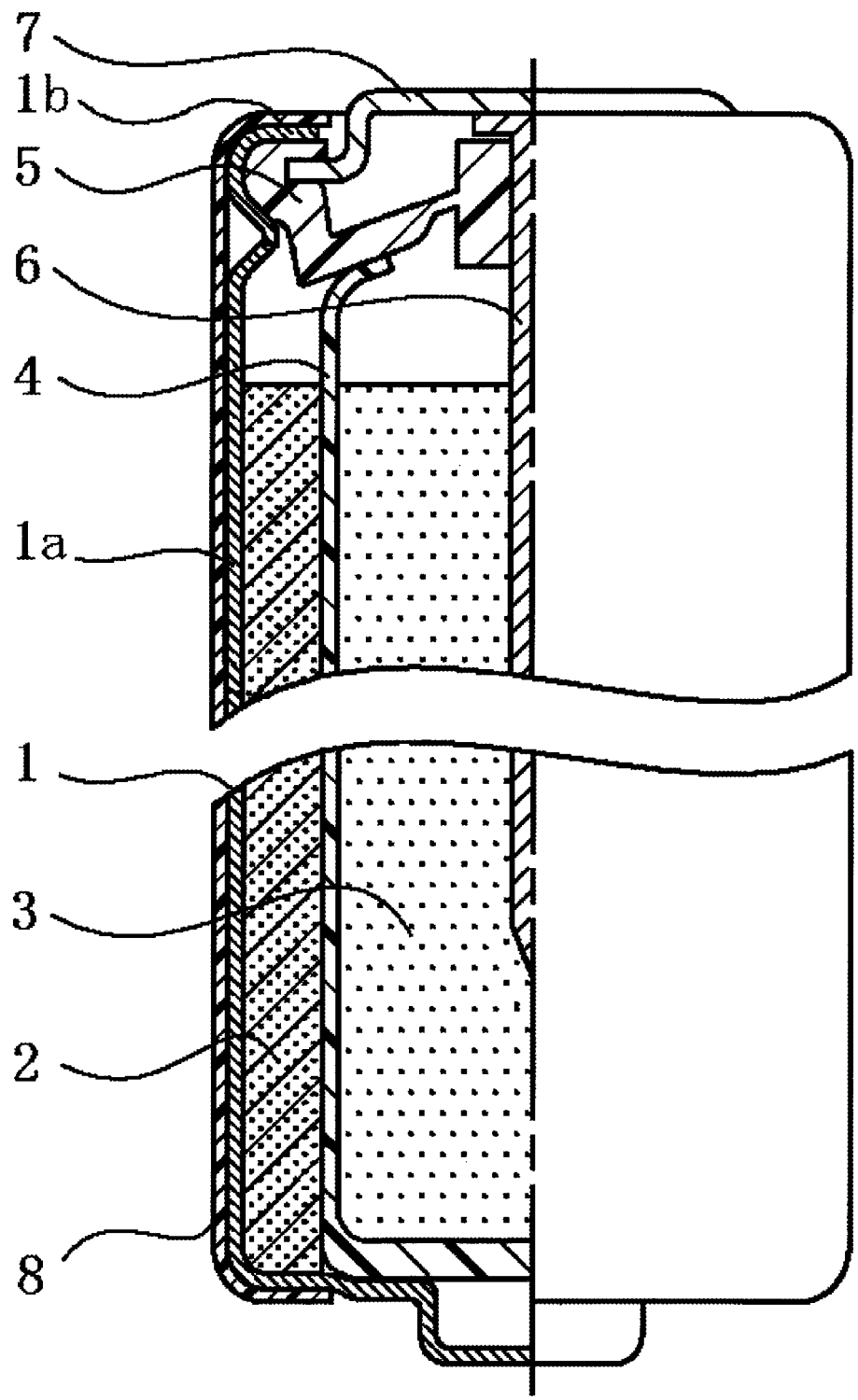
FIG. 1 is a half-sectional view illustrating a configuration of an alkaline battery according to the present disclosure.

According to the present disclosure, in an alkaline battery in which a positive electrode containing manganese dioxide, a negative electrode, and a separator interposed therebetween are housed in a closed-end cylindrical battery case whose opening is closed with a gasket, the positive electrode contains graphite in such a manner that a ratio of graphite to the positive electrode is in the range of 2.5-4.3 mass %, and a half-width of a 110 plane of the manganese dioxide measured by a powder X-ray diffraction analysis is in the range of 2.00-2.40 degrees.

The "ratio of graphite to the positive electrode" herein is a mass ratio of graphite to the total mass of manganese dioxide and graphite constituting the positive electrode.

Typically, as the ratio of graphite to the positive electrode increases, the amount of manganese dioxide that can be contained in the positive electrode increases. However, when the ratio of graphite to the positive electrode is 4.3 mass % or less, the use of conventional manganese dioxide degrades the discharge performance. That is, it was found that the availability of manganese dioxide decreases, resulting in insufficient discharge of the positive electrode.

Manganese dioxide having a gamma crystal structure is typically used for alkaline batteries. To improve discharge performance under a high load, so-called epsilon manganese dioxide whose crystal structure includes a high concentration of Mn vacancies has been popular in recent years. In addition, electrolytic manganese dioxide with high density and high purity has been typically used.

In a case where the half-width of the 110 plane of manganese dioxide measured by a powder X-ray diffraction analysis falls within a predetermined range, the above-described problems are solved because of the following reasons. Here, the 110 plane of the crystal structure of manganese dioxide is a distinct peak seen at an angle $2\theta$ (where $\theta$ is the X-ray incident angle) of about $22\pm1°$ in the powder X-ray diffraction analysis, and is used to represent a plane corresponding to the 110 plane when the manganese dioxide is assumed to have a ramsdellite structure.

Manganese dioxide is known to accelerate hydrogen ion conduction through the solid phase of manganese dioxide when Mn vacancy sites occur in a regular arrangement of Mn atoms and O atoms and hydrogen ions are placed at these sites. These Mn vacancy sites increase due to crystal strain or irregular atomic arrangement during electrolytic synthesis of manganese dioxide, and are formed under conditions where crystal does not readily grow. Thus, manganese dioxide conventionally used for achieving discharge performance under a high load has relatively poor crystallinity.

A small half-width of the 110 plane at a peak thereof measured by a powder X-ray diffraction analysis indicates a regular crystalline arrangement. That is, the small half-width of the 110 plane means that Mn atoms and O atoms are regularly arranged, and that primary crystalline particles are relatively large. Extension of the distance between atoms occurring when H atoms enter the array of Mn atoms and O atoms at the end of discharge reduces occurrence of distortion of crystalline particles, and thus, allows strain to be within crystals.

On the other hand, when the peak half-width is large, entering of H atoms due to discharge causes distortion of particles due to strain arising from a variation of the distance between atoms in crystals and also causes an increase in size in appearance. Thus, at the end of discharge, expansion of the positive electrode is reduced with decreasing half-width of the 110 plane obtained by a powder X-ray diffraction analysis.

In addition, as described above, manganese dioxide having regular arrangement of Mn atoms and O atoms and including relatively large primary crystalline particles has high electron conductivity.

Considering the foregoing facts, an increase in resistance of battery reaction caused by expansion of manganese dioxide at the end of discharge is expected to be reduced by using manganese dioxide having a small peak half-width of the 110 plane and regular crystalline arrangement.

In the present disclosure, expansion of manganese dioxide at the end of discharge can be reduced, and thus, the capacity of the battery can be increased as long as the ratio of graphite to the positive electrode is in the range of 2.5-4.3 mass % and the half-width of the 110 plane of manganese dioxide measured by a powder X-ray diffraction analysis is in the range of 2.00-2.40 degrees.

A peak half-width of the 110 plane within the range of 2.10-2.32 degrees can more effectively reduce expansion of manganese dioxide at the end of discharge.

Graphite added to the positive electrode increases electron conduction in the positive electrode necessary for discharge reaction and, in addition, serves as a binder for maintaining a pellet-shape of the positive electrode. A low ratio of graphite can increase the amount of manganese dioxide that can be contained in the battery, and thus, the discharge capacity increases theoretically. However, an excessively low ratio of graphite not only reduces the conductivity but also fails to reduce expansion of the positive electrode caused by manganese dioxide at the end of discharge. This situation tends to degrade discharge performance. Thus, the ratio of graphite to the positive electrode has an appropriate range.

Inventors of the present disclosure found that reduction of expansion of manganese dioxide itself is effective in a design with a reduced ratio of graphite to a positive electrode and an increased amount of manganese dioxide in the positive electrode.

In the case of a low ratio of graphite, a decrease in electron conduction in the positive electrode can lead to performance degradation. On the other hand, for manganese dioxide whose half-width of the 110 plane measured by a powder X-ray diffraction analysis is within the range of 2.00-2.40 degrees, electron conduction thereof higher than that of conventional manganese dioxide having a large half-width is effective for improving discharge performance. The ratio of graphite to the positive electrode is more preferably in the range of 3.0-4.0 mass %.

The potential of manganese dioxide is preferably 250-310 mV with respect to a mercury/mercurous oxide electrode in a 40% KOH aqueous solution. An initial open-circuit voltage of an alkaline battery using this manganese dioxide is preferably 1600-1640 mV.

In a preferred embodiment, the body of the battery case has a thickness of 0.12-0.18 mm. Such a thin body of the positive electrode case allows a larger amount of a positive electrode material to be contained, and can achieve a larger capacity. The thickness of the body of the battery case is more preferably 0.12-0.15 mm.

An embodiment of the present disclosure will be described with reference to the drawings. In the drawings, like reference characters have been used to designate identical or equivalent elements for simplicity of description. The present disclosure is not limited to the following embodiment.

FIG. 1 is a half-sectional view illustrating a configuration of an alkaline battery according to this embodiment.

As illustrated in FIG. 1, a positive electrode 2, a negative electrode 3, and a separator 4 interposed between the positive and negative electrodes 2 and 3 are housed in a closed-end cylindrical battery case 1 whose opening 1b is sealed with a gasket 5 and a negative electrode terminal plate 7.

The positive electrode 2 is made of manganese dioxide whose half-width of the 110 plane measured by a powder X-ray diffraction analysis is within the range of 2.00-2.40 degrees.

This configuration can improve discharge performance at discharge especially under an intermediate load.

The half-width of the 110 plane of manganese dioxide measured by a powder X-ray diffraction analysis used herein is a half-width of a diffraction line of the 110 plane at an angle $2\theta$ of about $22\pm1°$ in a diffraction pattern obtained by general X-ray diffraction using CuKα radiation source.

The half-width of the 110 plane of manganese dioxide can also be obtained from a positive electrode taken by disassembling an unused battery. In this case, an alkaline electrolyte is washed away immediately after disassembly, and a positive electrode that has been dried in a dry atmosphere at room temperature is measured by an X-ray diffraction analysis.

The positive electrode 2 contains graphite, and the ratio of graphite to the positive electrode is in the ratio of 2.5-4.3 mass %. The type and particle size, for example, of graphite are not specifically limited, and high-purity artificial graphite with an average particle size of 10-25 μm is preferable because such graphite eases molding of the positive electrode. Natural graphite or expanded graphite in a scaly shape of the same size may also be used. Alternatively, carbon black or carbon fibers, for example, may be added as a positive electrode conductive agent, polyethylene powder, for example, may be added as a binder, and stearate, for example, may be added as a lubricant.

The crystal structure and particle size, for example, of manganese dioxide is not specifically limited, and any manganese dioxide of a beta type, a gamma type, a lambda type, a delta type, or an epsilon type may be employed. Further, in addition to manganese dioxide, oxy nickel hydroxide, silver oxide, or copper oxide, for example, may be contained as a positive electrode active material. It is preferable to use high-density electrolytic manganese dioxide showing excellent discharge performance.

Manganese dioxide according to the present disclosure is preferably particles having an average particle size of 30-60 μm, and more preferably 35-45 μm. The degree of oxidation of Mn is preferably as high as possible, and the valence of Mn is preferably 3.9-4.0.

The mass loss rate, which reflects the percentage of Mn vacancies in manganese dioxide, is preferably in the range of 3.1-3.9% and is more preferably in the range of 3.2-3.7% in terms of discharge performance. The mass loss rate herein is obtained by dividing the difference between the mass at 400° C. and the mass at 100° C. by the mass at room temperature.

The BET specific surface area of manganese dioxide is preferably 22-34 $m^2$/g.

The type of the negative electrode 3 of the present disclosure is not specifically limited, and is preferably obtained by gelling with zinc powder as an active material, an alkaline electrolyte, and a gelling agent. The discharge capacity ratio between the positive and negative electrodes is such that the theoretical discharge capacity of the negative electrode to that of the positive electrode is preferably 1.00-1.25, and more preferably 1.07-1.17 in terms of excellent discharge performance. The discharge capacities in this case are such that the theoretical discharge capacity of manganese dioxide is 284 mAh/g and the discharge capacity of zinc is 710 mAh/g.

Zinc powder as the active material may be zinc alloy powder. The zinc alloy powder preferably has a high corrosion resistance, and is more preferably free from mercury, cadmium, and/or lead, for environmental protection. The zinc alloy may contain 0.01-0.1 mass % of indium, 0.005-0.02 mass % of bismuth, and 0.001-0.05 mass % of aluminium, for example. The zinc alloy may contain only one or more of these alloy components.

The alkaline electrolyte may be an aqueous solution containing potassium hydroxide as a main component, and preferably an aqueous solution containing 32.5-34.5 mass % of potassium hydroxide and 1.0-3.0 mass % of zinc oxide. A small amount of a silica compound is preferably added to the negative electrode because such addition reduces expansion of the positive electrode and the negative electrode. Specifically, 0.1-0.3 mass % of $NaSiO_2$ is preferably added.

The positive electrode preferably has a crack with a width of 2-10 μm formed by placing the positive electrode in the shape of a hollow cylindrical pellet into the battery case 1 and then molding the positive electrode again in the battery case under pressure. Specifically, in an AA battery, the positive electrode pellet is preferably molded again under a weight of 0.4-1.5 t because this re-molding can reduce the stress of expansion of manganese dioxide due to discharge.

The separator 4 herein may be a nonwoven fabric sheet of a mixture of various types of chemical fibers or a porous sheet of a synthetic resin such as cellophane or polyolefin, for example.

Examples

The structure and advantages of the present disclosure will be further described hereinafter using examples of the present disclosure. The present disclosure is not limited to these examples.

(Fabrication of Alkaline Battery)

An AA alkaline battery (LR6) illustrated in FIG. 1 was prepared through the following steps <1> to <7>.

<1> Battery Case

A nickel plated steel plate was pressed into a closed-end cylindrical battery case 1. The battery case 1 had a body 1a with a thickness of 0.18 mm <2> Separator A nonwoven fabric sheet having a basic weight of 25 g/$m^2$ and a thickness of 0.09 mm and mainly containing intertwined solvent-spun cellulose fibers and polyvinyl alcohol-based fibers at a mass ratio of 1:1 was wound three times to prepare a closed-end separator 4.

<3> Sealing Unit

A gasket 5 was prepared by injection-molding nylon 6,6 as a main component into a predetermined shape with predetermined dimensions. A negative electrode terminal plate 7 was prepared by pressing a nickel plated steel plate into a predetermined shape with predetermined dimensions. A negative electrode current collector 6 was prepared by performing tin plating on the surface of brass pressed into a nail shape. After the negative electrode current collector 6 has been electrically welded to the negative electrode terminal plate 7, the negative electrode current collector 6 was pressed and inserted into a through hole at the center of the gasket 5, thereby obtaining a sealing unit.

<4> Alkaline Electrolyte

An alkaline electrolyte of an aqueous solution containing 34.0 mass % of potassium hydroxide and 2.0 mass % of zinc oxide was prepared.

<5> Positive Electrode

Manganese dioxide powder having an average particle size of 40 μm and graphite powder were mixed at a predetermined mass ratio to obtain a mixture. This mixture and an alkaline electrolyte were mixed at a mass ratio of 100:1.9 and were sufficiently stirred, and the resulting mixture was press-formed into a flake shape. Then, the flake-shaped mixture was crashed into a granular shape, and was press-formed into a hollow cylindrical shape, thereby obtaining a pellet-shaped positive electrode 2.

The manganese dioxide powder was electrolytic manganese dioxide prepared in the following manner.

A round-bottom separable flask having a capacity of 2 L was used as an electrolytic bath, a titanium sheet of a size of 5 cm×5 cm with a thickness of 1 mm was used as an anode, and a platinum sheet of a size of 3 cm×3 cm with a thickness of 0.2 mm was used as a cathode. A pair of cathodes sandwich the anode and were spaced 2 cm apart from the lateral sides of the anode. An aqueous solution having a sulfuric acid concentration of 15 g/L and a manganese sulfate concentration of 70 g/L was used as a solution for the electrolytic bath at the start of electrolysis. Reagent chemicals made by KANTO CHEMICAL CO., INC. were used as manganese sulfate and sulfuric acid. In consideration of a change caused by electrolysis reaction, the hydrogen ion concentration (the sulfuric acid concentration) was changed at a substantially constant rate such that the sulfuric acid concentration reached 19 g/L at the end of 24-hour electrolysis. In this example, sulfuric acid, pure water, and a solution of manganese sulfate were supplied to the electrolytic bath at substantially constant rates. The manganese sulfate concentration was kept unchanged from the start to the end of the electrolysis. The electrolytic temperature was kept at 95±1° C. by adjusting the temperature of the electrolytic bath with a mantle heater, and electrolysis was continuously carried out for 24 hours.

The electrolytic current had an average current value described below, and was a variable current serving as a sine wave having an amplitude of 20% of that of the average current value and a frequency of 0.01 Hz. The half-widths of the 110 plane of electrolytic manganese dioxide measured by a powder X-ray diffraction analysis were 1.90, 2.00, 2.10, 2.20, 2.32, 2.40, and 2.50 degrees by changing the average current value to 25, 29, 33, 37, 41, 45, 50 A/m$^2$, respectively.

After completion of the electrolysis, manganese dioxide was separated from the titanium sheet, and coarsely crashed into particles of a size of about 300 μm. The particles were washed with deionized water at 60° C., and were washed with water by means of decantation until the pH of the aqueous solution reached 6. Then, the manganese dioxide was dried, and crashed to an average particle size of 40 μm. Then, 10 g of the resulting powder was supplied with 100 mL of deionized water. While this mixture was being stirred, 0.1 N of a sodium hydroxide aqueous solution was dropped onto the mixture, and the mixture was neutralized until the pH of a supernatant fluid of the mixture reached 6. Thereafter, the resulting powder was dried with hot air at 90° C. for two hours, and thereby, thereby obtaining manganese dioxide for use in the positive electrode.

<6> Negative Electrode

A gelling agent (a thickener of cross-linked and branched polyacrylic acid and water-absorbent polymer of highly cross-linked chain sodium polyacrylate), an alkaline electrolyte, and zinc alloy powder were mixed at a mass ratio of 0.26:0.54:35.2:64.0 to obtain a negative electrode 3. The zinc alloy powder contained 0.02 mass % of indium, 0.01 mass % of bismuth, and 0.005 mass % of aluminium.

<7> Assembly of Alkaline Battery

The pellet-shaped positive electrode 2 was inserted in the battery case 1, and pressed with a pressing jig into close contact with the inner wall of the battery case 1. The positive electrode 2 had a mass of 11.41 g and a volume of 4.086 cm$^3$, which were constant irrespective of the mixture ratio of the positive electrode and the type of manganese dioxide. After the separator 4 had been placed at the center of the positive electrode 2 that was in close contact with the inner wall of the battery case 1, the separator 4 and the positive electrode 2 were caused to absorb an electrolyte, and then the internal space of the separator 4 was filled with a predetermined amount of the negative electrode 3. Thereafter, the opening of the battery case 1 was sealed by crimping with a sealing unit interposed between the end of the opening and the sealing unit, and then the outer surface of the battery case 1 was covered with the external label 8.

(Evaluation of Discharge Performance Under Intermediate Load)

Using the assembled alkaline battery, the time until the battery voltage reached 0.90 V with a constant current of 100 mA was measured to obtain a discharge capacity (mAh).

(1) Conventional Alkaline Battery

The steps <1> to <7> were performed to obtain batteries 1-8 in which the ratio of graphite to the positive electrode was varied within the range of 2.0-6.0 mass % in manganese dioxide whose half-width of the 110 plane was 2.50 degrees.

The masses of graphite contained per 1 cm$^3$ of the positive electrode were 0.118 g, 0.110 g, and 0.082 g when the ratios of graphite to the positive electrode were 4.3 mass %, 4.0 mass %, and 3.0 mass %, respectively.

Table 1 shows results of evaluation on discharge performance of the batteries under an intermediate load.

Here, the discharge availability of manganese dioxide is the ratio of an actual discharge capacity to a theoretical discharge capacity (the mass of manganese dioxide×284 mAh/g) of manganese dioxide contained in the batteries.

TABLE 1

| | RATIO OF GRAPHITE IN POSITIVE ELECTRODE [%] | HALF-WIDTH OF 110 PLANE OF MANGANESE DIOXIDE MEASURED BY X-RAY DIFFRACTION [DEGREE] | AMOUNT OF MANGANESE DIOXIDE CONTAINED IN POSITIVE ELECTRODE [g] | DISCHARGE CAPACITY [mAh] | DISCHARGE UTILIZATION OF MANGANESE DIOXIDE [%] |
|---|---|---|---|---|---|
| BATTERY 1 | 6.0 | 2.50 | 10.53 | 2383 | 79.7 |
| BATTERY 2 | 5.0 | 2.50 | 10.64 | 2404 | 79.6 |
| BATTERY 3 | 4.3 | 2.50 | 10.72 | 2410 | 79.2 |
| BATTERY 4 | 4.0 | 2.50 | 10.75 | 2402 | 78.7 |
| BATTERY 5 | 3.5 | 2.50 | 10.81 | 2384 | 77.7 |
| BATTERY 6 | 3.0 | 2.50 | 10.86 | 2359 | 76.5 |
| BATTERY 7 | 2.5 | 2.50 | 10.92 | 2320 | 74.8 |
| BATTERY 8 | 2.0 | 2.50 | 10.97 | 2280 | 73.2 |

Table 1 shows that batteries 1-3 in each of which the ratio of graphite to the positive electrode was reduced to 4.3-6.0 mass % slightly increased their discharge capacities but batteries 4-8 in each of which the ratio of graphite to the positive electrode was below 4.3 mass % reduced their discharge capacities. That is, the use of manganese dioxide having a half-width of 2.50 of the 110 plane, such as conventional manganese dioxide, significantly reduces the discharge availability and does not increase the discharge capacity when the ratio of graphite to the positive electrode is excessively low.

(2) The Case where Half-Width of 110 Plane of Manganese Dioxide is Low

The steps <1> to <7> were performed to obtain batteries 9-24 in which the ratio of graphite to the positive electrode was varied within the range of 2.0-6.0 mass % in manganese dioxide whose half-width of the 110 plane was 2.10 degrees or 2.40 degrees.

Figure 2:
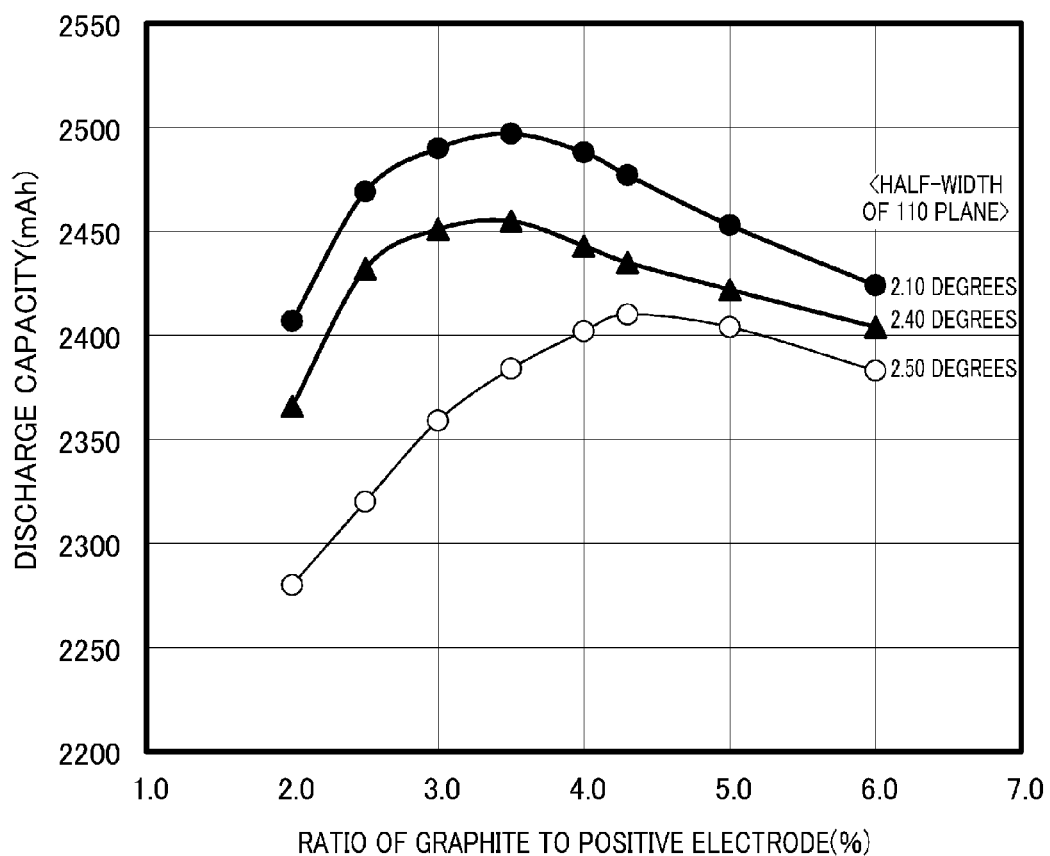
FIG. 2 is a graph showing the discharge capacity with respect to the ratio of graphite to a positive electrode.

Table 2 shows results of evaluation of discharge performance of these batteries under an intermediate load. For comparison, Table 2 also shows the results of batteries 1-8 shown in Table 1. FIG. 2 is a graph showing the results shown in Table 2.

TABLE 2

| | RATIO OF GRAPHITE IN POSITIVE ELECTRODE [%] | HALF-WIDTH OF 110 PLANE OF MANGANESE DIOXIDE MEASURED BY X-RAY DIFFRACTION [DEGREE] | AMOUNT OF MANGANESE DIOXIDE CONTAINED IN POSITIVE ELECTRODE [g] | DISCHARGE CAPACITY [mAh] | DISCHARGE UTILIZATION OF MANGANESE DIOXIDE [%] |
|---|---|---|---|---|---|
| BATTERY 1 | 6.0 | 2.50 | 10.53 | 2383 | 79.7 |
| BATTERY 2 | 5.0 | 2.50 | 10.64 | 2404 | 79.6 |
| BATTERY 3 | 4.3 | 2.50 | 10.72 | 2410 | 79.2 |
| BATTERY 4 | 4.0 | 2.50 | 10.75 | 2402 | 78.7 |
| BATTERY 5 | 3.5 | 2.50 | 10.81 | 2384 | 77.7 |
| BATTERY 6 | 3.0 | 2.50 | 10.86 | 2359 | 76.5 |
| BATTERY 7 | 2.5 | 2.50 | 10.92 | 2320 | 74.8 |
| BATTERY 8 | 2.0 | 2.50 | 10.97 | 2280 | 73.2 |
| BATTERY 9 | 6.0 | 2.40 | 10.53 | 2404 | 80.4 |
| BATTERY 10 | 5.0 | 2.40 | 10.64 | 2422 | 80.2 |
| BATTERY 11 | 4.3 | 2.40 | 10.72 | 2435 | 80.0 |
| BATTERY 12 | 4.0 | 2.40 | 10.75 | 2443 | 80.0 |
| BATTERY 13 | 3.5 | 2.40 | 10.81 | 2455 | 80.0 |
| BATTERY 14 | 3.0 | 2.40 | 10.86 | 2451 | 79.5 |
| BATTERY 15 | 2.5 | 2.40 | 10.92 | 2432 | 78.4 |
| BATTERY 16 | 2.0 | 2.40 | 10.97 | 2366 | 75.9 |
| BATTERY 17 | 6.0 | 2.10 | 10.53 | 2424 | 81.1 |
| BATTERY 18 | 5.0 | 2.10 | 10.64 | 2453 | 81.2 |
| BATTERY 19 | 4.3 | 2.10 | 10.72 | 2477 | 81.4 |
| BATTERY 20 | 4.0 | 2.10 | 10.75 | 2488 | 81.5 |
| BATTERY 21 | 3.5 | 2.10 | 10.81 | 2497 | 81.4 |
| BATTERY 22 | 3.0 | 2.10 | 10.86 | 2490 | 80.7 |
| BATTERY 23 | 2.5 | 2.10 | 10.92 | 2469 | 79.6 |
| BATTERY 24 | 2.0 | 2.10 | 10.97 | 2407 | 77.2 |

As shown in Table 2, when the half-width of the 110 plane of manganese dioxide is 2.10 degrees, batteries 11-15 in each of which the ratio of graphite to the positive electrode was 2.5-4.3 mass % had large discharge capacities and batteries 12-14 in each of which the ratio of graphite to the positive electrode was 3.0-4.0 mass % had discharge capacities larger than those of batteries 11-15.

When the half-width of the 110 plane was 2.40 degrees, batteries 19-23 in each of which the ratio of graphite to the positive electrode was 2.5-4.3 mass % had large discharge capacities and batteries 20-22 in each of which the ratio of graphite to the positive electrode was 3.0-4.0 mass % had discharge capacities larger than those of batteries 19-23.

Regarding the availability of manganese dioxide, when the ratio of graphite to the positive electrode was reduced, batteries 1-8 having large half-widths of the 110 planes showed significant decrease in availability, whereas batteries 9-24 having small half-widths showed small decrease in availability.

(3) The Case where the Ratio of Graphite to Positive Electrode is Low

The steps <1> to <7> were performed to obtain batteries 25-38 in which the half-width of the 110 plane of manganese dioxide was varied in the range of 1.90-2.50 degrees in manganese dioxide in which the ratio of graphite to the positive electrode is 3.3 mass % or 4.0 mass %.

Table 3 shows results of evaluation of discharge performance of these batteries under an intermediate load.

than those of batteries 26-30. Battery 31 in which the half-width of the 110 plane was 1.90 degrees had a small discharge capacity. This is because an excessively small half-width, i.e., excessively regular crystalline arrangement, of the 110 plane extremely reduces Mn vacancy sites in the crystal structure to hinder hydrogen ion conduction necessary for discharge reaction.

When the ratio of graphite to the positive electrode was 3.3 mass %, batteries 33-37 using manganese dioxide whose half-width of the 110 plane was 2.00-2.40 degrees also had discharge capacities larger than that of battery 32 in which the half-width of the 110 plane was 2.50 degrees. Battery 38 in which the half-width of the 110 plane was 1.90 degrees had a small discharge capacity.

(4) Thickness of Body of Battery Case Using battery cases in each of which the half-width of the 110 plane of manganese dioxide was 2.10 degrees and the thickness of the body 1a was

TABLE 3

| | RATIO OF GRAPHITE IN POSITIVE ELECTRODE [%] | HALF-WIDTH OF 110 PLANE OF MANGANESE DIOXIDE MEASURED BY X-RAY DIFFRACTION [DEGREE] | AMOUNT OF MANGANESE DIOXIDE CONTAINED IN POSITIVE ELECTRODE [g] | DISCHARGE CAPACITY [mAh] | DISCHARGE UTILIZATION OF MANGANESE DIOXIDE [%] |
|---|---|---|---|---|---|
| BATTERY 25 | 4.0 | 2.50 | 10.75 | 2402 | 78.7 |
| BATTERY 26 | 4.0 | 2.40 | 10.75 | 2443 | 80.0 |
| BATTERY 27 | 4.0 | 2.32 | 10.75 | 2489 | 81.5 |
| BATTERY 28 | 4.0 | 2.20 | 10.75 | 2508 | 82.2 |
| BATTERY 29 | 4.0 | 2.10 | 10.75 | 2488 | 81.5 |
| BATTERY 30 | 4.0 | 2.00 | 10.75 | 2448 | 80.2 |
| BATTERY 31 | 4.0 | 1.90 | 10.75 | 2381 | 78.0 |
| BATTERY 32 | 3.3 | 2.50 | 10.83 | 2340 | 76.1 |
| BATTERY 33 | 3.3 | 2.40 | 10.83 | 2453 | 79.8 |
| BATTERY 34 | 3.3 | 2.32 | 10.83 | 2493 | 81.1 |
| BATTERY 35 | 3.3 | 2.20 | 10.83 | 2511 | 81.7 |
| BATTERY 36 | 3.3 | 2.10 | 10.83 | 2494 | 81.1 |
| BATTERY 37 | 3.3 | 2.00 | 10.83 | 2447 | 79.6 |
| BATTERY 38 | 3.3 | 1.90 | 10.83 | 2376 | 77.3 |

As shown in Table 3, when the ratio of graphite to the positive electrode was 4.0 mass %, batteries 26-30 in each of which the half-width of the 110 plane was 2.00-2.40 degrees had larger discharge capacities than that of battery 25 in which the half-width of the 110 plane was 2.50 degrees. Batteries 27-29 in each of which the half-width of the 110 plane was 2.10-2.32 degrees had discharge capacities larger 0.18, 0.15, or 0.12 mm, the ratio of graphite to the positive electrode was varied within the range of 2.0-6.0 mass % to obtain batteries 39-62.

Figure 3:
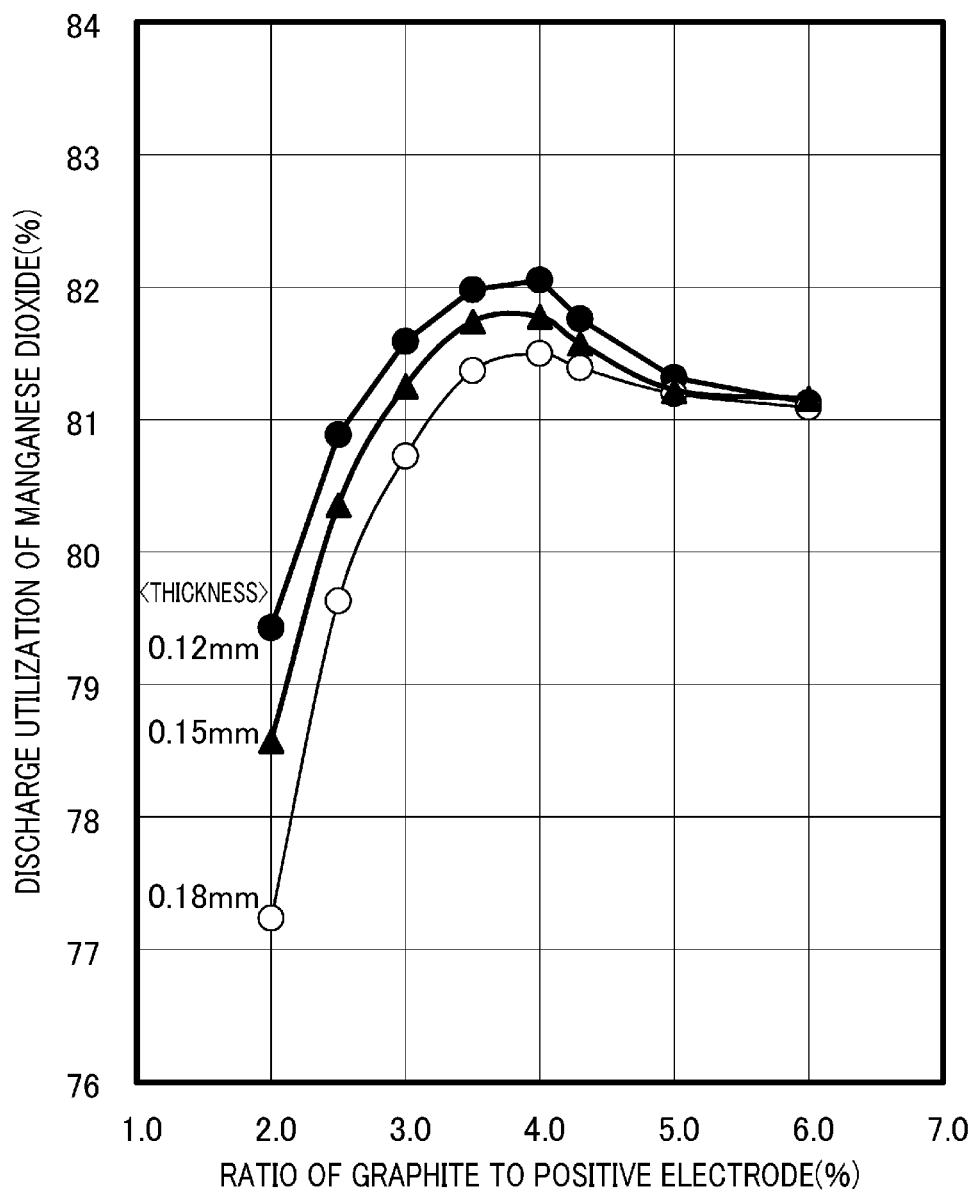
FIG. 3 is a graph showing discharge availability of manganese dioxide with respect to the ratio of graphite to the positive electrode.

Table 4 shows results of evaluation of discharge performance of these batteries under an intermediate load. FIG. 3 is a graph showing the results shown in Table 4.

TABLE 4

| | THICKNESS OF BATTERY CASE [mm] | RATIO OF GRAPHITE IN POSITIVE ELECTRODE [%] | AMOUNT OF MANGANESE DIOXIDE CONTAINED IN POSITIVE ELECTRODE [g] | DISCHARGE CAPACITY [mAh] | DISCHARGE UTILIZATION OF MANGANESE DIOXIDE [%] |
|---|---|---|---|---|---|
| BATTERY 39 | 0.18 | 6.0 | 10.53 | 2424 | 81.1 |
| BATTERY 40 | 0.18 | 5.0 | 10.64 | 2453 | 81.2 |
| BATTERY 41 | 0.18 | 4.3 | 10.72 | 2477 | 81.4 |
| BATTERY 42 | 0.18 | 4.0 | 10.75 | 2488 | 81.5 |
| BATTERY 43 | 0.18 | 3.5 | 10.81 | 2497 | 81.4 |
| BATTERY 44 | 0.18 | 3.0 | 10.86 | 2490 | 80.7 |
| BATTERY 45 | 0.18 | 2.5 | 10.92 | 2469 | 79.6 |
| BATTERY 46 | 0.18 | 2.0 | 10.97 | 2407 | 77.2 |
| BATTERY 47 | 0.15 | 6.0 | 10.60 | 2443 | 81.2 |
| BATTERY 48 | 0.15 | 5.0 | 10.71 | 2471 | 81.2 |
| BATTERY 49 | 0.15 | 4.3 | 10.79 | 2500 | 81.6 |
| BATTERY 50 | 0.15 | 4.0 | 10.82 | 2514 | 81.8 |
| BATTERY 51 | 0.15 | 3.5 | 10.88 | 2526 | 81.7 |
| BATTERY 52 | 0.15 | 3.0 | 10.94 | 2524 | 81.3 |
| BATTERY 53 | 0.15 | 2.5 | 10.99 | 2509 | 80.4 |
| BATTERY 54 | 0.15 | 2.0 | 11.05 | 2466 | 78.6 |
| BATTERY 55 | 0.12 | 6.0 | 10.67 | 2459 | 81.1 |
| BATTERY 56 | 0.12 | 5.0 | 10.79 | 2491 | 81.3 |
| BATTERY 57 | 0.12 | 4.3 | 10.87 | 2523 | 81.8 |
| BATTERY 58 | 0.12 | 4.0 | 10.90 | 2540 | 82.1 |
| BATTERY 59 | 0.12 | 3.5 | 10.96 | 2551 | 82.0 |
| BATTERY 60 | 0.12 | 3.0 | 11.01 | 2552 | 81.6 |
| BATTERY 61 | 0.12 | 2.5 | 11.07 | 2543 | 80.9 |
| BATTERY 62 | 0.12 | 2.0 | 11.13 | 2510 | 79.4 |

Table 4 shows that discharge performance improves with decreasing thickness of the body of the battery case when the same positive electrode is used. This is because of an increase of the internal volume of the battery case.

As shown in FIG. 3, regarding discharge availability of manganese dioxide, the discharge availability increases with decreasing thickness of the body of the battery case, and the difference in discharge availability is distinct in a region where the ratio of graphite to the positive electrode is low.

This is because of the following reasons. Since the positive electrode expands at the end of discharge, movement of the electrolyte and ions are is hindered in a battery. In this case, a thin body of the battery case allows the outer shape of the battery to expand easily in the radial direction, and thus, can reduce a decrease in discharge availability due to hindering of the electrolyte and ions at the end of discharge. The expansion of the positive electrode at the end of discharge is also related to the half-width of the 110 plane of manganese dioxide. Thus, a thinner body of the battery case can more easily achieve advantages of the present disclosure.

INDUSTRIAL APPLICABILITY

An alkaline battery according to the present disclosure exhibits excellent discharge performance and is suitably used for various types of equipment using dry batteries as power sources.

DESCRIPTION OF REFERENCE CHARACTERS 1 battery case
1a body
1b opening
2 positive electrode
3 negative electrode
4 separator
5 gasket
6 negative electrode current collector
7 negative electrode terminal plate
8 external label

The invention claimed is:

1. An alkaline battery in which a positive electrode containing manganese dioxide, a negative electrode, and a separator interposed therebetween are housed in a closed-end cylindrical battery case whose opening is sealed with a gasket, wherein
    the positive electrode contains graphite in such a manner that a ratio of graphite to the positive electrode is in the range of 2.5-4.3 mass %, and
    a half-width of a 110 plane of the manganese dioxide measured by a powder X-ray diffraction analysis is in the range of 2.00-2.40 degrees.

2. The alkaline battery of claim 1, wherein the half-width is in the range of 2.10-2.32 degrees.

3. The alkaline battery of claim 1, wherein the ratio of graphite to the positive electrode is in the range of 3.0-4.0 mass %.

4. The alkaline battery of claim 2, wherein the ratio of graphite to the positive electrode is in the range of 3.0-4.0 mass %.

* * * * *